(12) United States Patent
Raichle

(10) Patent No.: US 6,838,856 B2
(45) Date of Patent: Jan. 4, 2005

(54) APPARATUS AND METHOD FOR HIGH-FREQUENCY OPERATION IN A BATTERY CHARGER

(75) Inventor: Kurt Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/263,773

(22) Filed: Oct. 4, 2002

(65) Prior Publication Data

US 2004/0066663 A1 Apr. 8, 2004

(51) Int. Cl.$^7$ .............................................. H01M 10/46
(52) U.S. Cl. ..................................... 320/119; 320/121
(58) Field of Search ......................... 363/124; 320/116, 320/119, 121, 122, 138

(56) References Cited

U.S. PATENT DOCUMENTS

| | | | | |
|---|---|---|---|---|
| 4,374,355 A | * | 2/1983 | Steigerwald et al. | ........ 320/140 |
| 5,111,373 A | * | 5/1992 | Higaki | ......................... 363/37 |
| 5,289,101 A | * | 2/1994 | Furuta et al. | ................ 320/145 |
| 5,726,551 A | * | 3/1998 | Miyazaki et al. | ............ 320/124 |
| 6,175,511 B1 | * | 1/2001 | Ooba | ........................... 363/37 |
| 6,276,616 B1 | * | 8/2001 | Jenkins | ........................ 239/526 |

* cited by examiner

*Primary Examiner*—Bao Q. Vu
(74) *Attorney, Agent, or Firm*—Baker & Hostetler LLP

(57) ABSTRACT

A battery charger includes line-level input rectification, a high-frequency oscillator-controlled chopper circuit, multiple transformers operating in parallel, and controlled output rectification. Use of line-level input rectification reorders the elements of the battery charger compared to previous designs. A chopper frequency several orders of magnitude higher than that of the AC power mains is used. The use of multiple, parallel-wired transformers for voltage and current transformation eases constraints on the physical geometry of a manufactured battery charger product by permitting individual transformers, each smaller than a comparable single transformer, to be employed. Controlled output rectifiers permit power levels to be regulated dynamically.

16 Claims, 5 Drawing Sheets

US 6,838,856 B2

APPARATUS AND METHOD FOR HIGH-FREQUENCY OPERATION IN A BATTERY CHARGER

FIELD OF THE INVENTION

The present invention relates generally to industrial and motor vehicle battery chargers. More particularly, the present invention relates to an apparatus and method for using frequencies different from power mains in a storage battery charger.

BACKGROUND OF THE INVENTION

Rechargeable batteries are an important source of portable power for transportation and recreation equipment, utility devices, and other electrical applications. Maintenance of a rechargeable battery, also referred to as a storage or secondary battery, often requires charging the battery by converting power available from an alternating current (AC) source to meet the needs of the battery.

In pursuit of minimization of complexity and component cost, typical battery chargers operate at the same frequency as the electrical power distribution system, also called the AC mains, which is sinusoidal 60 Hz or 50 Hz AC virtually throughout the world. While inexpensive and straightforward in application, such battery charger designs fail to take advantage of recent innovations in electronic components and concepts that promise to permit significant benefits. For example, chargers operating at the AC mains frequency may not be as efficient as desired. They may also be larger and heavier than desired.

Accordingly, there is a need in the art for a battery charger that provides reduction in size and weight as well as enhanced power use efficiency compared to conventional designs.

SUMMARY OF THE INVENTION

It is therefore a feature and advantage of the present invention to take advantage of operating a battery charger's principal charging circuit at a significantly higher frequency than that of the power mains—for example, three to four orders of magnitude higher—which has the potential to reduce the size and weight of the battery charger.

It is an additional feature and advantage of the present invention to permit higher operating efficiency than that typical of previous designs.

The above and other features and advantages are achieved using a high-frequency power circuit, as herein disclosed.

A preferred embodiment of a power conversion system for performing storage battery servicing tasks, comprises an input circuit configured to accept high-voltage, low-current, low-frequency AC input power from public utility AC mains; a rectifier/chopper circuit configured to convert the incoming high-voltage, low-current, low-frequency AC input power to high-voltage, low-current, high-frequency AC pulsed power at a pulse rate determined by the rectifier/chopper circuit; a transformer configured to convert the high-voltage, low-current, high-frequency AC pulsed power from the rectifier/chopper to low-voltage, high-current, high-frequency AC power at a voltage level suitable for a battery being serviced; a low-voltage, high-current rectification circuit configured to convert the low-voltage, high-current, high-frequency AC power from the transformer into low-voltage, high-current, high-frequency pulsating DC; an output level sense circuit configured to detect properties of the low-voltage, high-current, high-frequency pulsating DC rectification circuit output; and a control/feedback circuit responsive to the output level sense circuit and configured to control the rectifier/chopper circuit to stabilize the output at a level established for the battery being serviced.

In accordance with another embodiment of the present invention, a switching DC power supply for connection to AC mains, configured to perform maintenance on vehicle storage batteries, incorporates a transformer having a ferrite core and an oscillator operating at a frequency higher than the AC mains frequency, preferably three to four orders of magnitude higher.

In accordance with another embodiment of the present invention, a switching DC power supply for connection to AC mains, configured to perform maintenance on vehicle storage batteries, incorporates a plurality of transformers, wired in parallel.

In accordance with another embodiment of the present invention, a switching DC power supply for connection to AC mains, configured to perform maintenance on vehicle storage batteries, incorporates controllable-turnon components for transformer output rectification.

In accordance with another embodiment of the present invention, a power conversion system for performing storage battery servicing tasks comprises means for accepting high-voltage, low-current, low-frequency AC input power from public utility AC mains; means for converting the incoming high-voltage, low-current, low-frequency AC input power to high-voltage, low-current, high-frequency AC pulsed power at a pulse rate determined by the means; means for transforming the high-voltage, low-current, high-frequency AC pulsed power from the means for converting to low-voltage, high-current, high-frequency AC power at a voltage level suitable for the battery being serviced; means for rectifying the low-voltage, high-current, high-frequency AC power from the means for transforming into low-voltage, high-current, high-frequency pulsating DC; means for sensing properties of the output of the rectifying means; and means for stabilization of overall power conversion at an output level established for the battery being serviced, with control feedback to control the rectifying means responsive to the output level sense means.

In accordance with another embodiment of the present invention, a power conversion method for performing battery servicing tasks comprises the following steps: accepting high-voltage, low-current, low-frequency AC input power from public utility AC mains; converting the incoming high-voltage, low-current, low-frequency AC input power to high-voltage, low-current, high-frequency AC pulsed power at a determined pulse rate; transforming the high-voltage, low-current, high-frequency AC pulsed power as converted in accordance with the converting step to low-voltage, high-current, high-frequency AC power at a voltage level suitable for the battery being serviced; rectifying the low-voltage, high-current, high-frequency AC power as transformed in accordance with the transforming step into low-voltage, high-current, high-frequency pulsating DC; sensing the output voltage of the rectified output; sensing the output current level of the rectified output; and responding to the sensed output level with control feedback to control the conversion step, thereby stabilizing overall power conversion at an output level established for the battery being serviced.

In accordance with still another embodiment of the present invention, a rectifier/chopper circuit converts incoming AC power to a higher frequency, controllable turnon-time AC signal. A transformer/rectifier circuit converts the high-voltage, low-current input to a low-voltage, high-current output. A sense circuit detects the achieved output level. A control circuit compares the sensed performance to a standard and provides turnon-time control to the rectifier/chopper circuit. An output section provides an interface to a battery being maintained.

There have thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A battery charger includes line-level input rectification, a high-frequency oscillator-controlled chopper circuit, multiple transformers operating in parallel, and controlled output rectification. Use of line-level input rectification reorders the elements of the battery charger compared to previous designs. A chopper frequency several orders of magnitude higher than that of the AC power mains is used. The use of multiple, parallel-wired transformers for voltage and current transformation eases constraints on the physical geometry of a manufactured battery charger product by permitting individual transformers, each smaller than a comparable single transformer, to be employed. Controlled output rectifiers permit power levels to be regulated dynamically.

Figure 1:
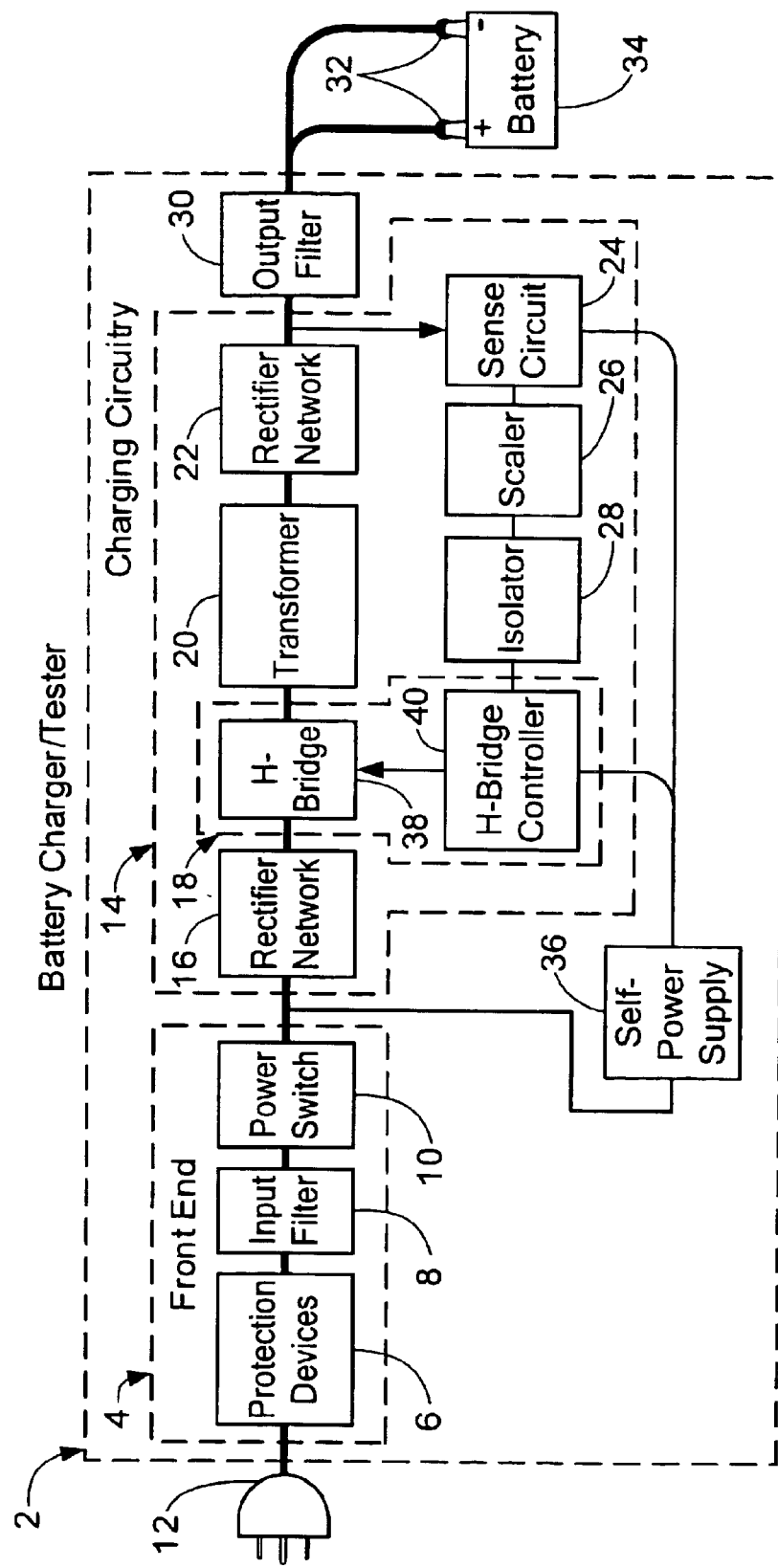
FIG. 1 is a circuit block diagram illustrating a battery charger that uses elevated-frequency internal circuitry according to a preferred embodiment of the present invention.

A preferred embodiment of the present inventive apparatus and method is shown in FIG. 1. Within a battery charger 2, a front-end circuit 4, comprised of a protection device 6, an electromagnetic interference (EMI) filter 8, and a main power switching device 10, draws power from AC mains by a standard electrical plug 12 and provides the power to charging circuitry 14. The charging circuitry 14's main signal path, shown by a heavy line, is comprised of a first rectifier arrangement 16, which rectifies incoming AC power to pulsating DC, followed by a switching circuit 18, a transformer functional group 20, and a second rectifier arrangement 22. A feedback path, shown by a light line within charging circuitry 14, and comprised of a sense circuit 24, a scaler 26 to adjust the signal level of the feedback, and an isolator 28 to protect the load side of the charger from AC faults, provides output level stabilization. The output side of the preferred embodiment consists of an output EMI filter 30, followed by a set of attaching devices 32 to provide low-resistance electrical continuity to a battery 34 being serviced. A self-power supply 36 provides for the needs of the battery charger itself.

The switching circuit 18, referred to above, is comprised of an H-bridge transistor array 38, that chops the pulsating DC power at a suitable rate, three to four orders of magnitude higher than that of battery chargers whose operating frequency is determined by AC power mains, and an H-bridge control circuit 40, that controls the turnon time for the transistors comprising the H-bridge 38. The transformer group 20 transforms the high-voltage, low-current, high-rate AC power from the switching circuit 18 to the low-voltage, high-current, high-rate AC power needed for the embodiment. The second rectifier arrangement 22 rectifies the AC of the transformer group 20 to the DC required by the battery 34.

Figure 2:
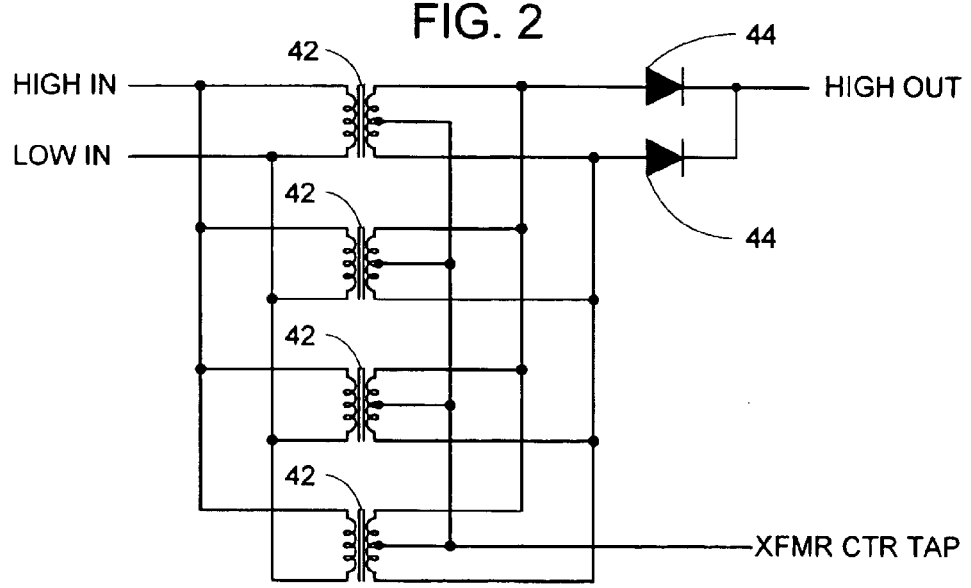
FIG. 2 is a detailed schematic representation of the multiple-transformer configuration used in the preferred embodiment of the invention, in which center-tapped transformers and two conventional rectifier diodes are used to implement the transformer output circuit.
Figure 3:
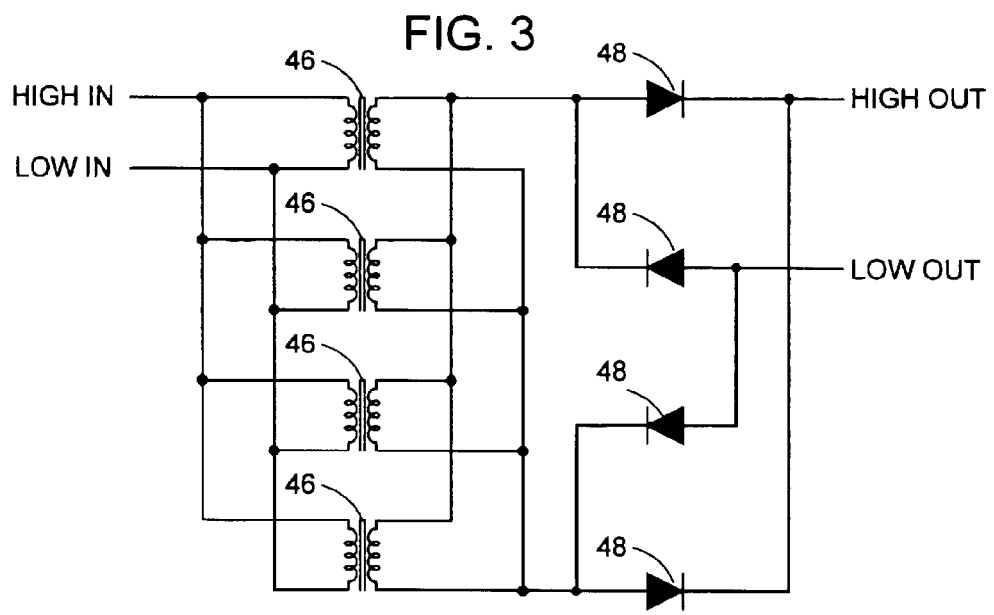
FIG. 3 is a transformer subcircuit schematic of an embodiment similar to FIG. 2 with the exception that a bridge rectifier configuration is employed in place of the center-tapped transformers.
Figure 4:
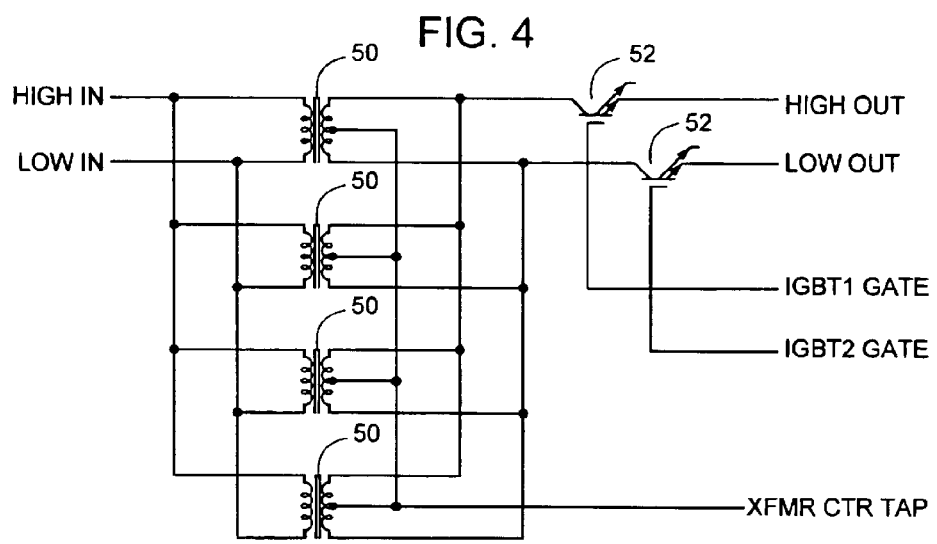
FIG. 4 is a transformer subcircuit schematic of an embodiment similar to FIG. 2 with the exception that IGBTs are employed in place of conventional rectifier diodes.

A preferred embodiment of the present invention, as illustrated in FIG. 2, incorporates a multiplicity of transformers 42 configured in parallel to perform voltage and current transformations. This embodiment includes output rectifier diodes 44 and center tapped transformers 42. FIG. 3 illustrates use of a non-center-tapped transformer 46, which requires bridge output rectifier diodes 48. FIG. 4, returning to center-tapped transformers 50, introduces output-side control by way of IGBTs 52. With lower forward drop and the opportunity for direct control of the on time of the output circuit, the IGBT design potentially runs cooler and with lower levels of EMI, offsetting added control circuit complexity with the possibility of product simplification. The multiplicity of parallel-wired transformers can achieve performance comparable to that of a single transformer while providing the potential of lower mounting weight, improved distribution of weight and heat, and freer housing layout.

Figure 5:
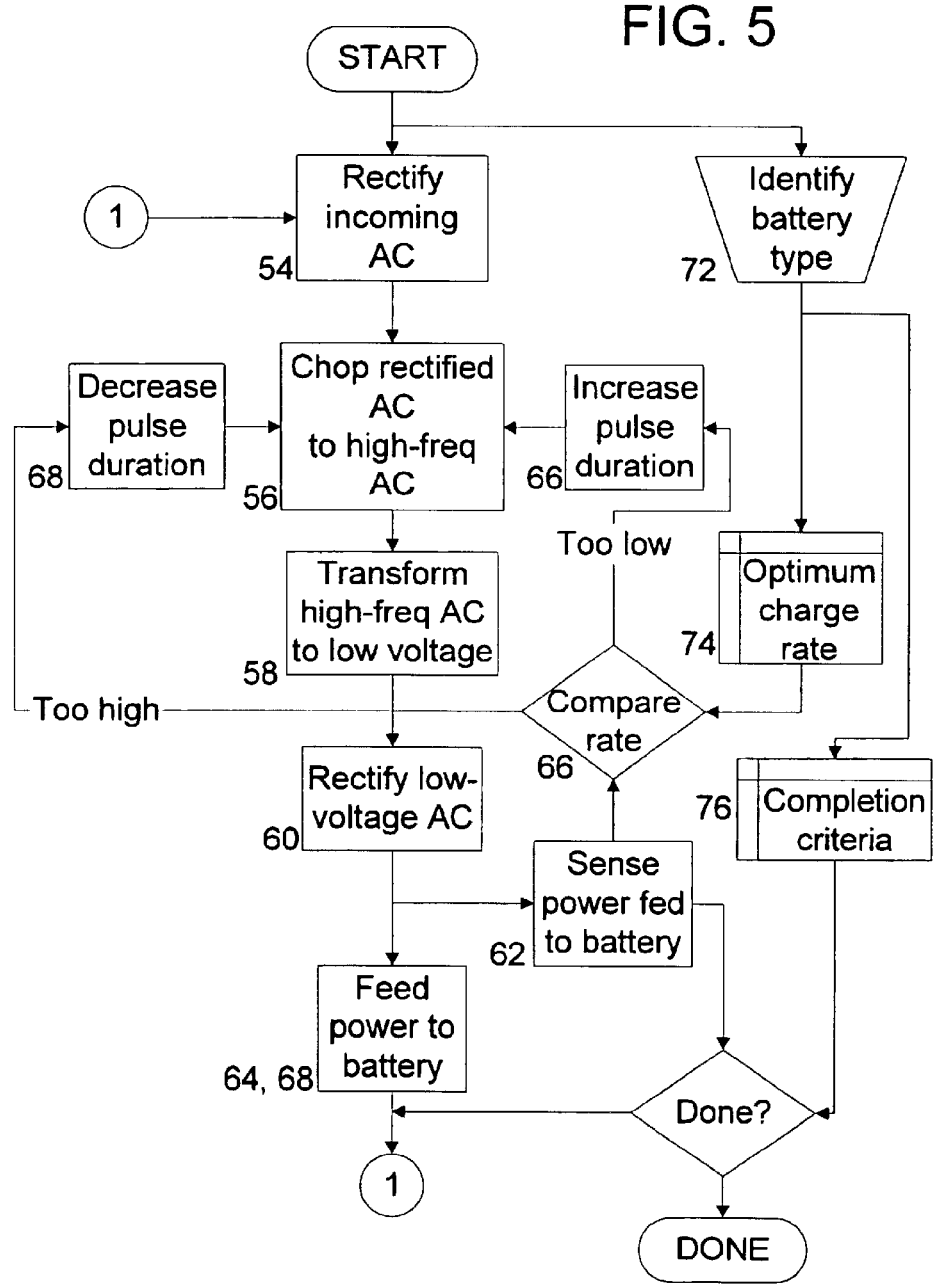
FIG. 5 provides a flowchart illustrating the steps performed by a circuit according to an embodiment of an elevated-frequency battery charger.

Another embodiment of the present inventive apparatus provides a means for applying power to such energy storage devices as batteries, as illustrated in flowchart FIG. 5. This embodiment provides a means for converting mains AC to a sinusoidally pulsating input DC 54. It further provides a means for chopping the pulsating input DC at a high rate 56 (e.g., on the order of 250 KHz) to produce a rough rectangular AC waveform of varying amplitude and duty cycle at the indicated pulse rate. The embodiment further provides a means for converting high-voltage, low-current energy to low-voltage, high-current energy at the same pulse rate 58.

The embodiment further provides means for converting this low-voltage, high-current AC to an output consisting of pulsating DC 60. The embodiment further provides means for monitoring the output pulsating DC 62 in such fashion as to determine its properties with regard to the task of charging a storage battery 64. The embodiment further provides means for increasing 66 or decreasing 68 the rate at which the means for chopping the sinusoidally pulsating input DC 56 provides power in accordance with the results of the monitoring. The embodiment further provides means for applying the output pulsating DC 70 to the subject storage battery 64.

Additional manual or automatic capabilities, such as detection of the type of battery 72, determination of battery requirements 74, and furnishing of charge rate requirements to charge circuitry 76, can be implemented if desired.

A system according to the preferred embodiment of the invention may have other design elements, such as, for example, a housing, input electromagnetic interference (EMI) filter circuitry, output EMI filter circuitry, protection circuitry to provide circuit interruption in event of power fault, power factor correction, isolation circuitry in the feedback path that crosses the transformer isolation boundary, a user interface, a load device for testing the capability of a subject battery, a temperature monitor, and other design elements appropriate for industrial application of the battery charging and testing functions. Incorporation into a battery charger of the capability to test a battery before and after charging, to verify its ability to accept and hold a charge, is a practice so well established in the art as to be a typical feature of a product offered for vehicle repair business use. A load device and the associated apparatus for evaluating the results of a load test add to a charger an increment of weight, complexity, and cost frequently viewed as well offset by the charger's increased utility. Thus, a battery charger offered for use in a business environment would likely include a load device to apply testing stress to a battery as a means of determining the condition of the battery.

The preferred embodiment of the invention, in providing for the use of a separate timebase function and in designing the circuit to operate at a clock frequency preferably three to four orders of magnitude higher than conventional designs, introduces advantages of physical size and weight whose benefits offset the disadvantages of adding to system complexity. Although a frequency of three to four orders of magnitude is preferable, multiples outside this range are also effective. Similarly, the use of multiple small transformers to provide the requisite voltage and current handling capability provides size and weight advantages while permitting distribution of mass and heat generation over broader areas, reducing structural and thermal point loading and easing design constraints.

In a complete implementation of the present invention, certain steps within this embodiment could be performed using a computing device, stored memory system, binary data input, and a human interface for commands and signals.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described; accordingly, all suitable modifications and equivalents may be resorted to, that fall within the scope of the invention.

What is claimed is:

1. A power conversion system for performing storage battery servicing tasks, comprising:
   an input circuit configured to accept AC input power from public utility AC mains;
   a rectifier/chopper circuit having a H-bridge network coupled to multiple transformers, wherein the rectified power is distributed therein for a combined high power output to convert the incoming AC input power to multiple-voltage, multiple-current, multiple-frequency pulsed power at a pulse rate determined by said rectifier/chopper circuit;
   a multiple-voltage, multiple-current rectification circuit configured to convert the multiple transformers' high output pulsating power to a DC output;
   an output level sense circuit configured to detect properties of the DC output; and
   a control/feedback circuit responsive to said output level sense circuit and configured to control said rectifier/chopper circuit to stabilize the output at level established for said battery being serviced.

2. The system of claim 1, further comprising:
   a load circuit for applying an electrical load to the battery being serviced.

3. The system of claim 1, further comprising:
   an auxiliary power circuit configured to provide, from the public-utility AC mains to said battery charger, power other than the power supplied to the battery being serviced.

4. The system of claim 1, further comprising:
   an attaching device to provide electrical connection to the battery being serviced.

5. The system of claim 1, wherein said input rectifier/chopper circuit includes an input rectifier circuit followed by a H-bridge transistor array.

6. The system of claim 1, wherein said input rectifier/chopper circuit includes an input rectifier circuit integrated with a chopper circuit.

7. The system of claim 1, wherein said input rectifier/chopper circuit performs its chopping function through use of insulated gate bipolar transistors (IGBTs) as the high-switching-rate power components applying the chopped DC power to said transformer.

8. The system of claim 1, wherein said multiple transformers are configured in parallel.

9. The system of claim 1, wherein said multiple-voltage, multiple-current rectification circuit performs its AC-to-DC conversion using IGBTs as the output rectification components.

10. The system of claim 1, wherein said control/feedback circuit controls the timing of the beginning of conduction of the multiple-voltage, multiple-current rectification circuit during each half-cycle of transformer output.

11. The system of claim 1, wherein said control/feedback circuit controls the output timing of said output rectification circuit through application of control signals to said output IGBTs.

12. A means for power conversion for performing storage battery servicing tasks, comprising:
   means for accepting AC input power from public utility AC mains;
   means for converting incoming AC input power to multiple-voltage, multiple-current, multiple-frequency pulsed power at a pulse rate determined by said converting means;

means for transforming the pulsed power from said converting means to a voltage level suitable for a battery being serviced, wherein the transforming means are comprised of a network of a plurality of transforming means connected to an H-bridge for distributing a combined high output power;

means for rectifying the power from said transforming means into pulsating DC;

means for sensing the level of said rectifying means output; and means for responding to said output level sense means with control feedback in order to control said rectifying means to stabilize the output at a level established for the battery being serviced.

13. The means of claim 12, wherein the plurality of transmeans are connected in parallel.

14. The means of claim 12, further comprising:

means for establishing electrical connection between said charging means and the battery being serviced.

15. A power conversion method for performance of battery service tasks, comprising the following steps:

accepting high-voltage, low-current, low-frequency AC input power from public utility AC mains;

converting the incoming high-voltage, low-current, low-frequency AC input power to multiple-voltage, multiple-current, multiple-frequency pulsed power at a determined pulse rate using a H-bridge network to split the power amongst a plurality of transformers, to enable a combined high-power output;

transforming the pulsed power to multiple-voltage, multiple-current, multiple-frequency power at a voltage level suitable for a battery being serviced;

rectifying the low-voltage, high-current, high-frequency AC power as transformed in accordance with the transforming step into a pulsating DC;

applying the pulsating DC to the battery being serviced;

sensing the voltage of the rectified power applied to the battery being serviced;

sensing the current level of the rectified power applied to the battery being serviced; and stabilizing overall power conversion using negative feedback in response to the sensed level at an output level established for the battery being serviced.

16. The method of claim 15, further comprising:

providing electrical connection between the charging method and the battery being serviced.

* * * * *